United States Patent [19]

Jaisingh et al.

[11] Patent Number: 5,600,633
[45] Date of Patent: Feb. 4, 1997

[54] WIRELESS TELECOMMUNICATION BASE STATION FOR INTEGRATED WIRELESS SERVICES WITH ATM PROCESSING

[75] Inventors: Gopal K. Jaisingh, Montville; Jesse E. Russell, Piscataway, both of N.J.

[73] Assignee: Lucent Technologies Inc., Murray Hill, N.J.

[21] Appl. No.: 393,784

[22] Filed: Feb. 24, 1995

[51] Int. Cl.$^6$ ................................................. H04B 1/66
[52] U.S. Cl. ..................... 370/277; 348/471; 370/395; 370/466; 370/467
[58] Field of Search ................................. 370/24, 36, 38, 370/60.1, 68.1, 71, 77, 94.1, 94.2, 110.1; 348/426, 469, 471, 472

[56] References Cited

U.S. PATENT DOCUMENTS

| | | | |
|---|---|---|---|
| 5,373,502 | 12/1994 | Turban | 370/95.3 |
| 5,394,402 | 2/1995 | Ross | 370/94.1 |
| 5,420,858 | 5/1995 | Marshall et al. | 370/60.1 |
| 5,461,627 | 10/1995 | Rypinski | 370/95.2 |

*Primary Examiner*—Benedict V. Safourek

[57] ABSTRACT

A wide variety of services both narrow band and broad band are provided to wireless stations both fixed and mobile by a flexible intelligent ATM base station. Such a base station provides two-way integrated voice, wireless date, wireless multimedia, and compressed video services to a wireless subscriber using different narrow band and wide band Common Air Interfaces (CAI). Uplink service includes narrow band signaling and bearer information signaling. By having a single base station perform these services, the number of station sites, required for a given level of service, may be significantly reduced and the spectrum utilization may be significantly increased.

9 Claims, 4 Drawing Sheets

WIRELESS TELECOMMUNICATION BASE STATION FOR INTEGRATED WIRELESS SERVICES WITH ATM PROCESSING

FIELD OF THE INVENTION

This invention relates to a wireless telecommunication system and in particular to such a system using Asynchronous Transfer Mode (ATM) signaling and bearer information processing.

BACKGROUND OF THE INVENTION

In a typical wireless communication system such as shown in FIG. 1, a wireless base station 139-N having radio transmission and reception capability connects to a wired telephone network 133. The base station 139-N communicates with both fixed and mobile end terminal subscriber stations. The end terminal devices may be mobile units such as mobile handheld units 124, or wireless drops to antennas 123 at fixed sites 121-N. Many of these sites may require a broader spectrum of services than provided by typical voice or wireless data telephony. However, the conventional wireless base station is restricted in the breadth of service that it can provide.

A new form of communication network processing is the use of Asynchronous Transfer Model signaling and bearer information processing. These ATM networks have great versatility; hence it may be advantageous to enable wireless devices to connect to these ATM networks to reap the benefits of versatility.

SUMMARY OF THE INVENTION

A wide variety of services both narrow band and broad band are provided to wireless stations both fixed and mobile by a flexible intelligent ATM base station. Such a base station provides two-way integrated voice, wireless data, wireless multimedia, and compressed video services to a wireless subscriber using different narrow band and wide band Common Air Interfaces (CAI). Uplink service includes narrow band signaling and bearer information signaling. By having a single base station perform these services, the number of station sites, required for multiple services, is significantly reduced, and the utilization of RF spectrum significantly increased.

An illustrative uplink air-to-network interface from the subscriber to the ATM network includes a radio system that separates the signaling and bearer information streams, an ATM protocol conversion system that maps the separated streams into ATM Cell structure, and a network interface that transmits the ATM cell stream into the ATM network. A reverse network interface-to-air arrangement has a network interface that receives ATM cells from the ATM network, an ATM processing system that converts the ATM cells into bearer information and signaling streams, and a radio system that transmits the information to the subscriber using an appropriate narrow or wide band common air interface (CAI).

DETAILED DESCRIPTION

Figure 1:
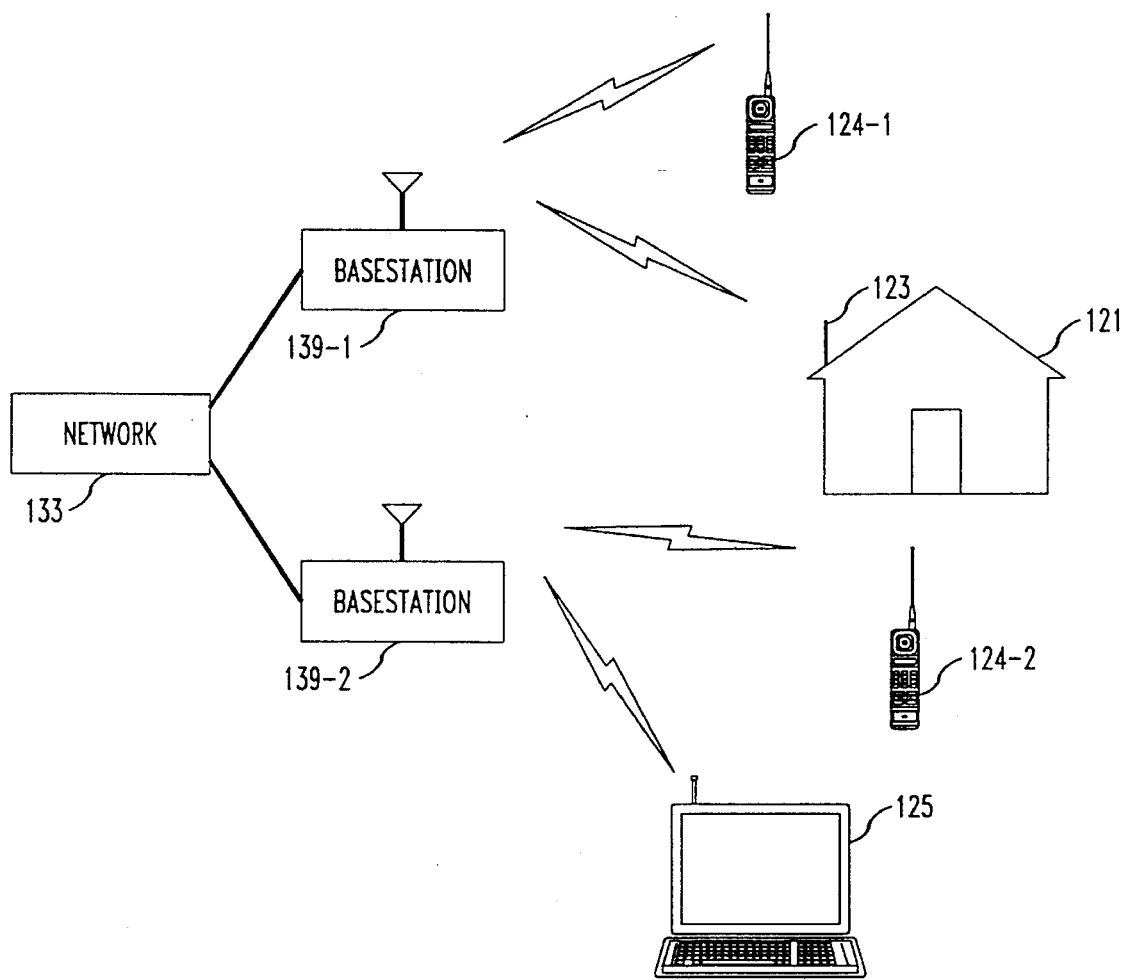
FIG. 1 is a schematic of a wireless communication system.
Figure 2:
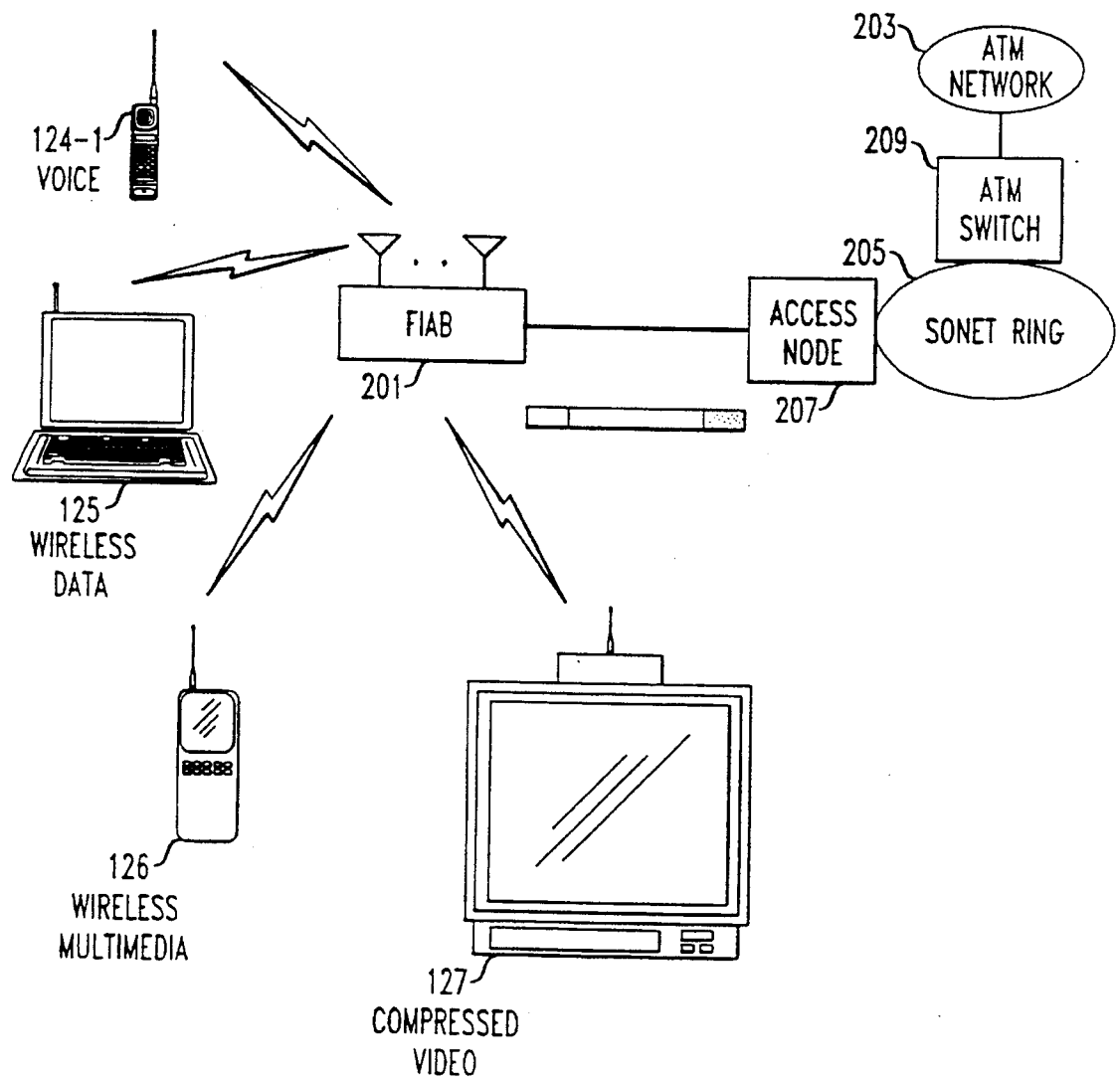
FIG. 2 is a schematic of a connection of a Flexible Intelligent ATM base station to an ATM network.

A wireless communication system shown in FIG. 2 couples a network 203 to a base station 201 which in turn communicates, via a CAI, through one or more antennas with a plurality of wireless subscriber units 124-N, 125, 126, and 127. In accord with the invention, the network 203 is an ATM network, which transmits information via ATM cells through ATM networks. In this arrangement the base station is an intelligent ATM base station that facilitates conversion of information from various services and CAIs into ATM format for transmission over the ATM network.

Connection of the Flexible Intelligent ATM base station (FIAB) 201 to the network 203 is through an access node 207, which is connected to a Fiber ring 205. This in turn is connected to an ATM switch 209 and to the ATM network 203.

The FIAB 201 is shown connected by the CAI to various wireless receivers including a compressed video receiver 127, a wireless multimedia receiver 126, a wireless data receiver 125, and a voice subscriber unit 124-N.

Figure 3:
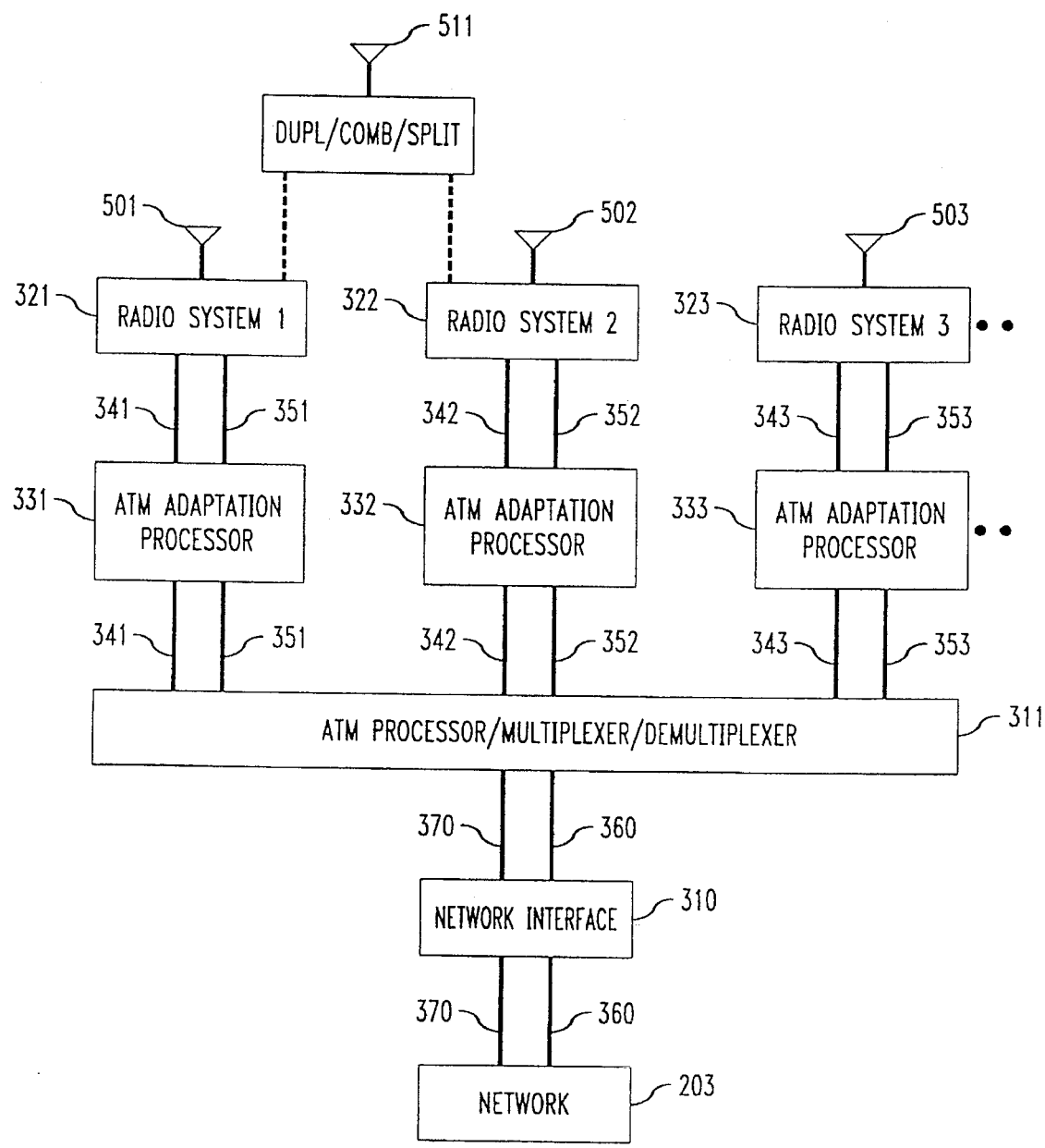
FIG. 3 is a block schematic of a flexible intelligent ATM base station embodying the principles of the invention.

The FIAB 201 is shown in a detailed block schematic in FIG. 3 in which an ATM processor multiplexer/demultiplexer 311 is connected by an interface 310 to an ATM network 203. In the illustrative embodiment, the ATM multiplexer/demultiplexer 311 is connected to three radio systems 321, 322, and 322 via the ATM adaptation processors 331, 332 and 333. The invention is not restricted to this particular number; a plurality of radio systems may be included to accommodate different services, CAIs, available spectrum or to divide into sectors an area of coverage. The radio systems include radio processing and transceiver circuitry and antenna devices 501, 502, and 503 to radiate and receive radio, telephone and other wireless communication signals. In an alternative illustrative system, plural radio systems may share as antenna 511 through a duplexer/combiner/splitter arrangement.

The ATM adaptation processors 331, 332, and 333 convert ATM cell streams into an appropriate air interface signaling and bearer information streams. In the downlink mode the signaling and bearer streams are separated and the separated streams are mapped into the ATM cell streams.

FIG. 3 shows signal streams 341–343 separated from bearer streams 351–353 as the streams are sent from the radio systems 321–323 through the ATM adaptation processors 331–333 to the ATM processor/multiplexer/demultiplexer 311. The information streams continue as separate signal stream 370 and bearer stream 360 to the network interface 310 and then to the network 203.

Figure 4:
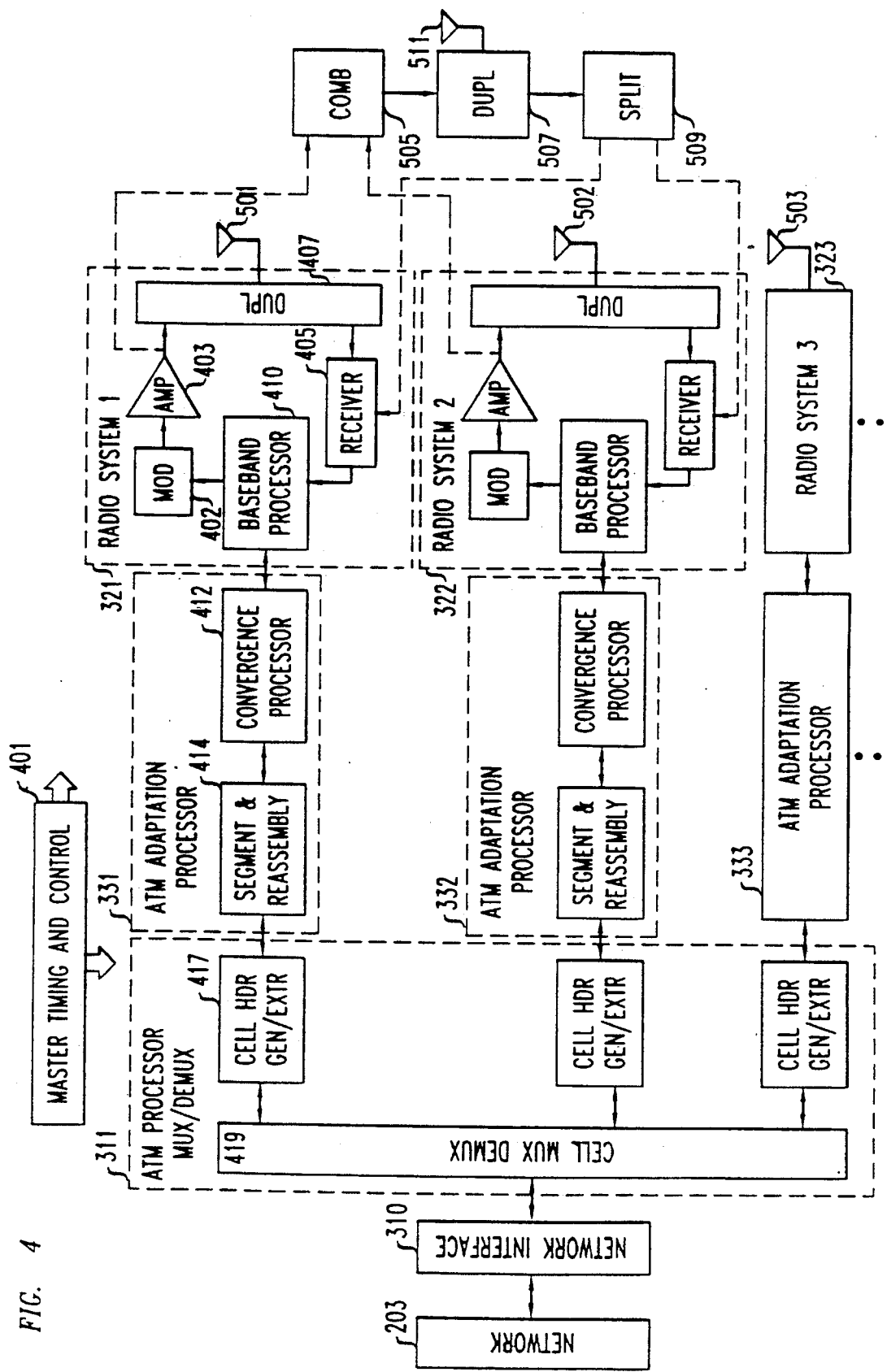
FIG. 4 is a schematic of a detail for the flexible intelligent ATM base station of FIG. 3.

The block schematic of FIG. 4 discloses an illustrative embodiment of the radio, ATM adaptation processor, multiplexer, and interface to the network. The radio unit includes antenna for radiating and receiving signals which is connected to a duplexer 407 for allowing dual use of the antennas. Incoming signals are applied to a receiver 405 which couples received signals to a baseband processor 410. Outgoing signals from the baseband processor are applied to a modulator 402 and then via an amplifier 403 to a duplexer and then to the antennas 501. Other radio systems 2, 3 are similar in functions except that they may utilize different CAI and provide different services to subscribers. The radio systems can alternately share an antenna 511, where feasible, through duplexer 507, combinet 505, and splitter 509.

Typically, the baseband processor included in the radio system provides three functions: (1) audio coding/decoding; (2) channel coding/decoding; and (3) separation of signaling and bearer information streams. The baseband processor is connected to a convergence processor 412 which packetizes the information. The convergence processor is connected to a segmentation and reassembly (SAR) processor 414 which, for the downlink direction, breaks down the packetized information into smaller packets, adds error correction and sequencing fields and generates the ATM payload packets corresponding to the ATM adaptation layer suitable for the service being provided (typically 48 bytes long). For the uplink direction it assembles the received ATM payload into larger packets for processing by the convergence processor. The SAR is connected to a cell header generator/extractor 417 which adds the appropriate ATM header to the payload to form 53 byte ATM cells, in the downlink direction, and extract the headers in the uplink directions.

Cell multiplexer/demultiplexer 419 combines ATM cells from different radio systems or demultiplexes received cells from the network. The FIAB is connected to the ATM network through a network interface 310 which typically provides functions such as: (1) framing the ATM cell stream for the network being used (e.g., SONET OC3), bit timing, and electro-optical interfaces for the specific physical medium being utilized. A master timing and control circuit 401 controls the signal flow and timing thereof throughout the base station system.

We claim:

1. A flexible intelligent base station, comprising:

a network interface for connecting to an ATM communication network;

an ATM adaptation processor for mapping signaling and bearer information streams into ATM cell streams and converting ATM cell streams into signaling and bearer information streams;

an ATM processor multiplexer/demultiplexer coupling the air-to-network interface with air as the data transmission medium and ATM adaptation processor to each other; and first radio processing circuitry connected to the ATM adaptation processor and including circuitry for processing the signaling and bearer information streams and antenna apparatus for radiating such information streams and for receiving such streams over the air interface.

2. A flexible intelligent base station, as claimed in claim 1, comprising:

a second and third radio processing circuitry; and second and third ATM adaptation processors, each connecting the multiplexer/demultiplexer to the second and third radio processing circuitry, respectively.

3. A flexible intelligent base station, as claimed in claim 2, comprising: the first, second and third radio processing circuitry and the first, second and third ATM adaptation processors each being dedicated to a service and each having a different frequency band.

4. A flexible intelligent base station for providing two-way integrated voice, wireless data, wireless multimedia, and compressed video services to a wireless subscriber, comprising:

an uplink, air-to-network interface coupling the wireless subscriber to an ATM communications network and including:

a radio system for separating signaling and bearer information streams, an ATM protocol conversion system for mapping separated signaling and bearer information streams into an ATM cell structure, and a network interface for transmitting the ATM cell structure into the ATM network; and a downlink, network-to-air interface coupling the ATM communications network to the wireless subscriber and including:

a network interface for receiving ATM cells from the ATM networks, an ATM processing circuit for converting ATM cells into signaling and bearer information streams, and the radio system including circuitry for transmitting the signaling and bearer information streams to the subscriber using an appropriate narrow or wide band common air interface.

5. A flexible intelligent base station for providing two-way integrated voice, wireless data, wireless multimedia, and compressed video services to a wireless subscriber, as claimed in claim 4, and the ATM processing circuit including means for segmentation of a received information L1 for the radio circuitry.

6. A flexible intelligent base station for providing two-way integrated voice, wireless data, wireless multimedia, and compressed video services to a wireless subscriber, as claimed in claim 4, and the ATM processing circuit including means for reassembly of ATM cells into a form suitable for radio transmission by the radio system to which it is connected.

7. A flexible intelligent base station for providing two-way integrated voice, wireless data, wireless multimedia, and compressed video services to a wireless subscriber, as claimed in claim 4, and the ATM processing circuit including means for convergence of signals coupling it to the radio system.

8. A flexible intelligent base station for providing two-way integrated voice, wireless data, wireless multimedia, and compressed video services to a wireless subscriber, as claimed in claim 7, and the means for convergence of signals including means for assembling packets into cells and means for assembling cells into packets.

9. A flexible intelligent base station for providing two-way integrated voice, wireless data, wireless multimedia, and compressed video services to a wireless subscriber, comprising:

an uplink, air-to-network interface coupling the wireless subscriber to an ATM communications network and including:

a radio system for separating signaling and bearer information streams, an ATM protocol conversion system for mapping separated signaling and bearer information streams into an ATM cell structure, and a network interface for transmitting the ATM cell structure into the ATM network; and an ATM processing circuit for reconverting ATM cells into signaling and bearer information streams suitable for the radio system, including:

means for segmentation of a received information stream, means for reassembly of ATM cells into a form for radio transmission by the radio system to which it is connected, and means for convergence of signals coupling it to the radio system including means for assembling packets into cells and means for assembling cells into packets; and the radio system including circuitry for transmitting the signaling and bearer information streams to the subscriber using an appropriate narrow or wide band common air interface.

* * * * *